United States Patent [19]

Kopala et al.

[11] Patent Number: 4,896,083

[45] Date of Patent: Jan. 23, 1990

[54] SUCCESSIBLE SWITCH ACTIVATED CONTROL CIRCUIT

[75] Inventors: Walt W. Kopala, Lenexa, Kans.; Benny Lee, Taipei, Taiwan

[73] Assignee: Transworld Products, Inc., Shawnee, Kans.

[21] Appl. No.: 190,257

[22] Filed: May 4, 1988

[51] Int. Cl.⁴ .................................................. H02P 7/36

[52] U.S. Cl. .................................. 318/268; 340/310 R

[58] Field of Search ............... 318/138, 254, 268, 305; 98/40.05, 40.07; 340/310 R, 310 A, 310 CP

[56] References Cited

U.S. PATENT DOCUMENTS

| | | | |
|---|---|---|---|
| 2,606,232 | 2/1950 | St. John | 361/366 |
| 3,601,632 | 8/1971 | Frazier | 361/56 |
| 3,648,166 | 5/1972 | Bedeck et al. | 361/118 Y |
| 3,894,274 | 7/1975 | Rosenberg, Jr. | 361/56 |
| 3,914,657 | 10/1975 | Melanson | 361/117 |
| 3,987,343 | 10/1976 | Cunningham et al. | 361/118 |
| 4,322,632 | 3/1982 | Hart et al. | 340/310 A X |
| 4,465,956 | 8/1984 | Fowler | 318/268 |
| 4,502,089 | 2/1985 | Ozawa et al. | 361/127 |
| 4,528,456 | 7/1985 | Harris | 318/138 X |
| 4,719,446 | 1/1988 | Hart | 340/310 A |

*Primary Examiner*—Bentsu Ro

*Attorney, Agent, or Firm*—Hovey, Williams, Timmons & Collins

[57] ABSTRACT

A control circuit is provided preferably for use with a ceiling fan and lamp unit having operating power supplied thereto by way of a wall switch and which allows successive operation of the wall switch to selectively energize the fan and lamp thereby avoiding the need for a separate pull chain. The preferred control circuit is electrically interposed between the wall switch and the fan and lamp unit and includes a sensing circuit for sensing successive applications of operating power from the wall switch and an activating circuit responsive to the sensing circuit for selectively activating the fan and lamp in a plurality of output combinations in predetermined sequence upon successive wall switch operations. In preferred use, the wall switch is successively operated to the on position until the desired load combination is achieved.

18 Claims, 1 Drawing Sheet

| SW | $Q_1$ | $\overline{Q_1}$ & $T_1$ | $Q_2$ & $T_2$ | F | L |
|---|---|---|---|---|---|
| 1 | 0 | 1 | 0 | 1 | 0 |
| 2 | 1 | 0 | 1 | 0 | 1 |
| 3 | 0 | 1 | 1 | 1 | 1 |
| 4 | 1 | 0 | 0 | 0 | DIM |
| 5 | 0 | 1 | 0 | 1 | 0 |

SUCCESSIBLE SWITCH ACTIVATED CONTROL CIRCUIT

BACKGROUND OF THE INVENTION

1. Field of the Invention

The present invention relates to a control circuit preferably for use with a ceiling fan and lamp unit having operating power supplied thereto by a wall switch. More particularly, the present invention relates to a control circuit which produces sequential combinations of outputs in response to successive applications of input power to the circuit.

2. Background of the Prior Art

Ceiling units incorporating a slowly rotating, large diameter fan and one or more incandescent lamps have become very popular as a method of eliminating air stratification, for illumination, and for decorative purposes. A conventional wall switch is typically used to supply operating power to the ceiling unit which also includes one or more pull chains or cords connected to appropriate switches used to select the desired combination of activated outputs.

In use, the wall switch must be turned on and then one must walk over to and then operate the pull chain or cord in order to select the desired combination of activated outputs. Thus, the requirement for one or more pull chains or cords presents an inconvenience in operation and the presence of a pull chain or cord suspended from the ceiling unit may detract from its aesthetic appearance as well. Accordingly, the prior art points out the need for a more convenient way of operating ceiling units which does not aesthetically detract from the appearance of the unit.

SUMMARY OF THE INVENTION

The problems of the prior art as outlined above are solved by the control circuit of the present invention. That is to say, the control circuit hereof in preferred use with a ceiling unit having a fan and one or more lamps allows successive operation of the wall switch to select the desired combination of activated outputs without the need for an aesthetically objectionable pull chain or cord suspended from the unit.

The preferred control circuit includes input means for coupling with a source of switched input power, a plurality of outputs for coupling with a plurality of output devices for activation thereof in response to activation of the outputs, and an operating circuit coupled with the input means and the outputs. The preferred operating circuit includes a sensing circuit for sensing successive applications of input power from the source and an activating circuit coupled with the sensing circuit and responsive thereto for selectively activating certain of the outputs for producing a plurality of predetermined combinations of activated outputs in predetermined sequence upon successive applications of input power.

In particular, the preferred control circuit includes two flip-flops which sense successive applications of input power thereto and in turn activate a pair of relays which produce a plurality of predetermined combinations of activated outputs in response.

Preferably the control circuit includes a capacitor which charges upon the first application of input power in order to keep the flip-flops energized for brief periods between applications so that the flip-flops may respond to subsequent successive power inputs.

BRIEF DESCRIPTION OF THE DRAWING FIGURES

DETAILED DESCRIPTION OF THE PREFERRED EMBODIMENT

Figures 1, 2:
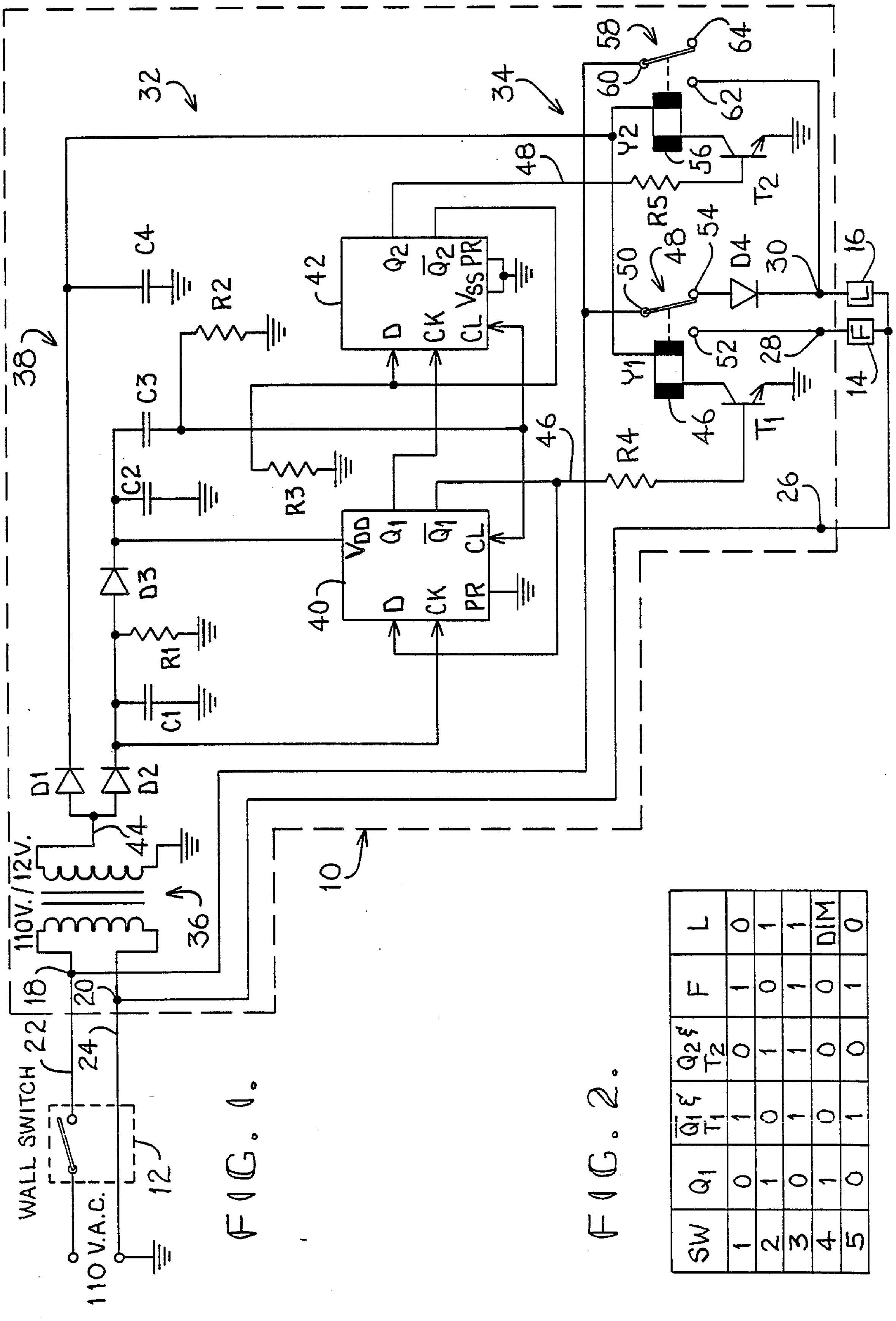
FIG. 1 is a electrical schematic diagram illustrating the preferred control circuit in its preferred environment of use.
FIG. 2 is a truth table illustrating various sequential output combinations of the control circuit of FIG. 1.

FIG. 1 illustrates preferred control circuit 10 in its preferred environment of use with wall switch 12, fan 14, and lamp 16. As will become clear from the discussion herein, the utility of control circuit 10 is not limited to the preferred environment of use as described herein, but is useful in any environment wherein the source of operating power can be successively alternated between higher and lower levels and in which it is desired to selectively activate a plurality of outputs in different combinations of outputs.

Control circuit 10 is preferably designed as a single unit enclosed in a suitable housing which presents a pair of accessible input terminals 18 and 20 to which the source of input power can be coupled. In the preferred embodiment, the load side of the wall switch 12 is connected to terminal 18 and the ground, neutral, or return wire is connected to terminal 20. As illustrated in FIG. 1, wall switch 12 switches a conventional source of supply at 110 volts A.C. to terminal 18 via line 22. The neutral wire from the power source is connected via line 24 to input terminal 20.

As preferably designed, control circuit 10 also presents a plurality of output terminals to which the output devices can be connected. In the preferred embodiment, control circuit 10 presents three output terminals 26, 28, and 30. Terminal 26 is a common terminal which connects to the common side of the output loads, that is, to the common side of fan 14 and lamp 16. Terminal 26 is electrically common with terminal 20 and thus line 24 to provide the return circuit from the output devices. Terminal 28 is the output for connection to fan 14 and terminal 30 is the output for connection to lamp 16.

With the preferred external arrangements of terminals as described above, control circuit 10 is conveniently and easily wired into an existing ceiling unit having a fan and lamp. That is to say, the installer connects the two input lines 22, 24 to input terminals 18 and 20 respectively and connects the respective lines from the output devices to terminals 28 and 30 with the common line from the devices connected to terminal 26.

Circuit 10 broadly includes sensing circuit 32 and activating circuit 34. Sensing circuit 32 includes transformer 36, input circuit 38, and flip-flops 40 and 42.

In general, sensing circuit 32 senses successive applications of input power to terminals 18, 20 such as when wall switch 12 is successively operated. With each successive application input power, sensing circuit 32 and activating circuit 34 produce a different combination of outputs at output terminals 28 and 30 as will be described further hereinbelow.

Transformer 36 is a conventional unit for transforming 110 volt A.C. to 12 volt A.C. and receives input power to the primary thereof from terminals 18 and 20. One side of the transformer secondary is grounded as shown, and the other side delivers power at 12 V.A.C. via line 44 to input circuit 38.

Input circuit 38 receives the 12 V.A.C. output on line 44 from transformer 36 at the respective anodes of half-wave rectifying diodes D1 and D2 (type 1N4148). The cathode of diode D1 provides power to one side of capacitor C4 (100 u.F.) the other side of which is grounded, and to activating circuit 34 as will be explained further hereinbelow.

The cathode of diode D2 delivers power to clock terminal CK of flip-flop 40, to one side of capacitor C1 (1.0 u.F.) the other side of which is grounded, to one side of pull-down resistor R1 (56K ohms) the other side of which is grounded, and to the anode of blocking diode D3 (type 1N4148). Capacitor C1 provides some ripple filtering for the rectified output from diode D2.

The cathode of blocking diode D3 is connected to terminal $V_{DD}$ of flip-flop 40, to one side of capacitor C2 (220 u.F.) the other side of which is grounded, and to one side of capacitor C3 (1.0 u.F.). The other side of capacitor C3 is connected to the reset or clear terminals CL of both flip-flops 40 and 42 and to one side of pull-down resistor R2 (10K ohms). The other side of resistor R2 is grounded as shown. Capacitor C2 provides energy storage such that after being charged it maintains flip-flops 40 and 42 operational when the power input is off for about 2.5 seconds before discharging through the flip-flops 40, 42.

Flip-flops 40 and 42 (Dual type flip-flops in a single unit) receive input power and signals from input circuit 38. Terminals PR of flip-flops 40, 42 are each grounded as is terminal $V_{ss}$ of flip-flop 42. Output terminal $\overline{Q}_1$ of flip-flop 40 is interconnected with data terminal D, and terminal $Q_1$ of flip-flop 40 is connected to clock terminal CK of flip-flop 42 as shown in FIG. 1. Terminal $\overline{Q}_2$ of flip-flop 42 is connected to data terminal D thereof and to one side of pull-down resistor R3 the other side of which is grounded.

Flip-flop 40 provides an output to activating circuit 34 from terminal $\overline{Q}_1$ via line 46. Flip-flop 42 provides an output to activating circuit 34 from terminal $Q_2$ via line 48. The outputs on lines 46, 48 are either off, that is, logic low or "0" at 0 Volts D.C., or on, that is, logic high or "1" at about +5 V.D.C. Thus, four different output combinations are possible as illustrated in the truth table of FIG. 2. That is to say, lines 46, 48 can both be on, both off, or one on and the other off.

During operation sensing circuit 32, successive closures of wall switch 12 produce successive applications of input power to control circuit 10 which results in sequential production of the four output combinations upon each operation of switch 12. More particularly, the first operation of switch 12 charges capacitors C1–4. During the charging of capacitor C3, a "clear" signal is presented to terminals CL of flip-flops 40 and 42 respectively. This initializes both flip-flops so that respective terminals $Q_1$ and $Q_2$ are off and terminals $\overline{Q}_1$ and $\overline{Q}_2$ are on. Pull-down resistor R2 quickly removes the CLEAR signal from respective signals CL after capacitor C3 is charged. Thus, the initial combination of outputs on lines 46 and 48 is 1 and 0, that is on and off respectively. Additionally, terminals D of each flip-flop are initialized at 1 because of their respective interconnections with terminals $\overline{Q}_1$ and $\overline{Q}_2$.

The "clear" signal is removed from terminals CL as soon as capacitor C3 is charged. If switch 12 is then opened, capacitor C1 quickly discharges through resistor R1, but capacitors C2 and C3 are prevented from discharging through resistor R1 because of the presence of blocking diode D3. Thus, capacitor C2 maintains flip-flops 40 and 42 operational for about 2.5 seconds and C3 remains charged thereby to prevent another clear signal when power is reapplied. If wall switch is not reclosed within that period of time, capacitors C2 and C3 discharge through flip-flops 40 and 42, and sensing circuit 32 reverts to its original condition before the first closure of wall switch 12.

The second closure of wall switch 12 produces a second voltage rise through transformer 36 and diode D2 to terminal CK of flip-flop 40. This voltage rise clocks through the data present at terminal D thereof recalling that the input to terminal D was set at "1" during the first switch closure. Thus, upon the second closure, terminal $Q_1$ of flip-flop 40 goes logic high and terminal $\overline{Q}_1$ goes logic low and thereby so does line 46.

When terminal $Q_1$ of flip-flop 40 goes high to terminal CK of flip-flop 42, data is clocked through from terminal D thereof so that terminal $Q_2$ and line 48 goes high and terminal $\overline{Q}_2$ goes low. Thus, the second output combination upon the second closure of switch 12 results in line 46 at logic low and line 48 at logic high.

If switch 12 is then opened and closed again to produce the third application of input power to control circuit 10, another voltage rise is applied to terminal CK of flip-flop 40 which results in terminal $Q_1$ at logic low and terminal $\overline{Q}_1$ at logic high. Because terminal $Q_1$ goes logic low, flip-flop 42 does not change state, and terminal $Q_2$ and line 48 remain logic high. Thus, after the third closure of wall switch 12, both lines 46 and 48 are logic high or "1".

If wall switch 12 is then opened and reclosed to produce the fourth successive application of input power to control circuit 10, a fourth voltage rise is applied to terminal CK of flip-flop 40 which causes terminal $Q_1$ to go logic high, and terminal $\overline{Q}_1$ and line 46 to go logic low. The leading edge of the logic high signal from terminal $Q_1$ to terminal CK of flip-flop 42 causes flip-flop 42 to change state resulting in terminal $Q_2$ and line 48 at logic low. Thus, both lines 46 and 48 are logic low after the fourth successive closure of wall switch 12.

A fifth operation of wall switch 12 produces a fifth voltage rise at terminal CK of flip-flop 40 which causes terminal Q1 to go logic low, and terminal $\overline{Q}_1$ and line 46 to go logic high. With terminal $\overline{Q}_1$ at logic low, no clock signal is received at terminal CK of flip-flop 42 and thus the status of flip-flop 42 remains the same with terminal $Q_2$ and line 48 at logic low. Thus, line 46 is logic high and line 48 is logic low which is also the initial output combination produced after the first closure of wall switch 12. In this way, the output combinations from lines 46 and 48 are produced in a repeating sequence upon successive closings of wall switch 12. That is to say, the fifth line of the truth table FIG. 2 is the same as the first line.

The output combinations produced by sensing circuit 32 are delivered via lines 46 and 48 to activating circuit 34 which in turn causes sequential combinations of outputs at output terminals 28 and 30.

Activating circuit 34 includes resistors R4 and R5 (10K ohms each), conventional electromechanical relays Y1 and Y2, transistors T1 and T2, and diode D4.

Relay Y1 includes relay coil 46 and relay contact 48 having common terminal 50 and contact terminals 52 and 54. Relay Y2 includes relay coil 56 and contact 58 having common terminal 60 and contact terminals 62 and 64.

Line 46 is connected to one side of resistor R4 the other side of which is connected to the base of transistor T1. The emitter of transistor T1 is grounded and the collector is connected to one side of relay coil 46.

Line 48 is connected to one side of resistor R5 the other side of which is connected to the base of transistor T2. The emitter of transistor T2 is grounded and the collector is connected to one side of relay coil 56.

The other sides of coils 46 and 56 are connected together and to the cathode of diode D1 for reception of operating power therefrom.

Common terminals 50 and 60 of contacts 48 and 58 respectively are each connected to input terminal 18 in order to receive power at 110 V.A.C. therefrom.

Contact terminal 52 is connected to output terminal 28 and contact terminal 54 is connected by way of diode D4 which functions as an output reduction unit to output terminal 30. Contact 62 of relay Y2 is also connected to output terminal 30.

After the first closure of wall switch 12, line 46 is logic high, that is on, and line 48 is at logic low, that is off. With line 46 on, transistor T1 is enabled to complete the circuit from transformer 36 through diode D1, through relay coil 46 and transistor T1 to ground in order to energize coil 46. This in turn switches contact 48 to complete the circuit between terminals 50 and 52 thereof. Thus, fan 14 is energized through wall switch 12, line 22, contact terminals 50 and 52 and output terminal 28.

Because line 48 is off or low, relay coil 56 remains deenergized, relay contact 58 remains in the position as shown in FIG. 1, and terminal 30 is not active. Thus, the first closure of wall switch 12 results in an output combination wherein terminal 28 is active at 110 volts A.C. and terminal 30 is inactive. Correspondingly fan 14 is energized and lamp 16 is deenergized.

After the second successive closure of wall switch 12, line 46 is off and line 48 is on. With line 48 on, relay coil 56 is energized and contact 58 is switched to complete the circuit between terminals 60 and 62 thereby providing power at 110 volts A.C. to output terminal 30. Thus, after the second successive operation of wall switch 12, the output combination results with output terminal 28 deactive and output terminal 30 active at 110 volts A.C. This results in fan 14 being off and lamp 16 being energized or on.

After the third operation of wall switch 12, both lines 46 and 48 are logic high and both relay coils 46 and 56 are energized. Correspondingly, both output terminals 28 and 30 are active at 110 volts A.C. and both fan 14 and lamp 16 are energized thereby resulting in the third sequential combination of active outputs.

After the fourth successive closure of wall switch 12, both lines 46 and 48 are logic low or off. Correspondingly, both relay coils 46 and 56 are deenergized. However, with relay coil 46 de-energized, contact 48 completes the connection between terminals 50 and 54 thereof which in turn provides operating power at 110 volts A.C. through diode D4 to output terminal 30. In the preferred embodiment, the operating power is supplied as alternating current and diode D4 half-wave rectifies the alternating current output at terminal 30 thereby reducing by half the amount of power supplied to lamp 16. Accordingly, lamp 16 is illuminated at only half power and is thereby "dim" by comparison to its full illumination. Thus, with the fourth combination of outputs, fan 14 is off and lamp 16 is dim.

As discussed above, the fifth operation of wall switch 12 produces an output combination the same as the first and the output combinations thereafter repeat in sequence.

With control circuit 10 installed in a conventional ceiling unit having a fan and lamp, either as a retrofit or original equipment, the user can select one of the predetermined output combinations by convenient successive operation of wall switch 12. In this way, the inconvenience and aesthetically distracting presence of pull chains or cords are avoided and the user need only operate the wall switch 12 in succession in order to achieve the desired output combination.

As those skilled in the art will appreciate, control circuit 10 can be used in any environment in which it is desired to select a plurality of active output combinations by successive applications of input power to control circuit 10. In this way, the necessity for separate switches or operations is avoided which can be particularly useful when the output devices are remotely located or located where access to a pull chain or pull cord is inconvenient. As a matter of design choice, terminal 62 can be separated from terminal 30 and provided with its own output terminal as can terminal 64 to produce a total of four separate outputs for activation of four separate output loads. Furthermore, a resistor could be used in place of diode D4 to perform the dimming function.

Finally, those skilled in the art will appreciate that additional flip-flops can be included to produce additional combinations of outputs as a matter of design choice. That is to say, the inclusion of a third flip-flop can produce a total of nine possible output combinations, four flip-flops would allow sixteen combinations, and so forth. Additionally, the present invention contemplates the use of other devices other than the preferred flip-flops and relays for producing the desired sequence of output combinations. For example, latching electromechanical relays could be used as well as other solid state devices such as counters in place of the preferred flip-flops.

Having thus described the preferred embodiment of the present invention, the following is claimed as new and desired to be secured by Letters Patent:

1. A control circuit for selectively activating a plurality of output devices in response to successive applications of input power to said circuit from a source thereof, said control circuit comprising:

input means for coupling with the source of input power;

a plurality of outputs for coupling with the output devices and for activating the devices in response to activation of said outputs; and operating circuit means coupled with said input means and said outputs and including sensing circuit means for sensing successive applications of input power from the source, and activating circuit means coupled with said sensing circuit means and responsive thereto for selectively activating certain of said outputs for producing a plurality of predetermined combinations of activated outputs in a predetermined sequence upon said successive applications of input power, said control circuit including reducing structure for producing one of said combinations in which a certain one of said outputs is activated at a first output level and for producing another of said combinations at which said certain one of said outputs is activated at a second, reduced output level, said reducing structure including a diode and relay means for selectively activating said certain ones of said outputs through said diode for reducing the power flow therethrough in order to produce said second reduced output level.

2. The circuit as set forth in claim 1, said operating circuit means including means for responding to a successive application of input power occurring within a predetermined period of time.

3. The circuit as set forth in claim 2, said predetermined period of time being about 2.5 seconds.

4. The circuit as set forth in claim 1, said sensing circuit means including a flip-flop.

5. The circuit as set forth in claim 1, said activating circuit means including a relay.

6. The circuit as set forth in claim 1, the input power source including a switch means for alternately switching the input power on and off, said sensing circuit means including an energy storage means for maintaining the operational status of said sensing circuit means for a predetermined period of time while said input power source is off.

7. The circuit as set forth in claim 6, said energy storage means including a capacitor.

8. The circuit as set forth in claim 7, said sensing circuit means including means for discharging said capacitor after said predetermined period of time.

9. The circuit as set forth in claim 8, said sensing circuit means including a flip-flop.

10. The circuit as set forth in claim 1, said activating circuit means including a respective relay for activating each of said outputs.

11. A circuit for receiving operating power from a switched source thereof having a switch for selective successive applications of operating power to said circuit and, in response thereto, for selectively energizing a fan and at least one lamp, said circuit comprising:

input means for coupling with the switched source;

a fan output for coupling with the fan and for energizing the fan when coupled therewith upon activation of said fan output;

a lamp output for coupling with the lamp and for energizing the lamp when coupled therewith upon activation of said lamp output; and control circuit means coupled with said input means and with said fan and lamp outputs and including sensing means for sensing successive applications of operating power to said input means, and activating means coupled with said sensing means and responsive thereto for selectively activating said outputs for producing a plurality of predetermined combinations of activated outputs in a predetermined sequence upon successive applications of operating power, said combinations including a combination in which only one of said fan and lamp outputs are activated and including another combination in which both of said outputs are activated, said activating means including an output reduction unit and switch means coupled therewith, said output reduction unit also being coupled with said input means for receiving operating power therefrom and with said lamp output, said switch means being selectively actuatable between a first position for supplying operating power to and thereby activating said lamp output at a first output level and a second position for supplying operating power to said lamp output through said output reduction unit thereby activating said lamp output at a second reduced output level in order to energize said lamp coupled to said lamp output at a dimmer illumination level output in said second position than in said first position.

12. The circuit as set forth in claim 11, said operating power being alternating current, said output reduction unit including a diode.

13. The circuit as set forth in claim 11, said activating means including a relay.

14. The circuit as set forth in claim 11, said combinations including one combination which said lamp output is activated at said first output level and another combination in which said lamp output is activated at said second output level.

15. The circuit as set forth in claim 11, the source including a switch means for alternately switching the operating power on and off, said sensing means including an energy storage means for maintaining the operational status of said sensing means for a predetermined period of time while said operating power is off.

16. The circuit as set forth in claim 15, said energy storage means including a capacitor.

17. The circuit as set forth in claim 11, said combinations including a combination in which said lamp output is activated and said fan output is deactivated, another combination in which said lamp output and said fan output are both activated, and a further combination in which only said fan output is activated.

18. The circuit as set forth in claim 11, said activating means including respective relays for activating each of said outputs.

* * * * *